(12) United States Patent
Hilnbrand et al.

(10) Patent No.: US 10,025,316 B1
(45) Date of Patent: Jul. 17, 2018

(54) AUTOMATED VEHICLE SAFE STOP ZONE USE NOTIFICATION SYSTEM

(71) Applicant: Delphi Technologies, Inc., Troy, MI (US)

(72) Inventors: Brian R. Hilnbrand, Mountain View, CA (US); Michael H. Laur, Mission Viejo, CA (US); Divya Agarwal, Sunnyvale, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/467,611

(22) Filed: Mar. 23, 2017

(51) Int. Cl.
*G05D 1/00* (2006.01)
*G05D 1/02* (2006.01)

(52) U.S. Cl.
CPC ......... *G05D 1/0214* (2013.01); *G05D 1/0088* (2013.01); *G05D 1/0274* (2013.01)

(58) Field of Classification Search
CPC ... G05D 1/0214; G05D 1/0088; G05D 1/0274
USPC ....... 701/25, 26, 301, 23, 423, 514; 430/436
See application file for complete search history.

(56) References Cited

U.S. PATENT DOCUMENTS

| | | | |
|---|---|---|---|
| 9,764,640 B2 * | 9/2017 | Matsuno | B60K 28/10 |
| 2011/0215947 A1 * | 9/2011 | Ekmark | G08G 1/163 |
| | | | 340/902 |
| 2012/0101711 A1 * | 4/2012 | Furmston | G01S 7/415 |
| | | | 701/300 |
| 2016/0231746 A1 * | 8/2016 | Hazelton | G05D 1/0212 |
| 2017/0274901 A1 * | 9/2017 | Herbach | B60W 50/0225 |

* cited by examiner

*Primary Examiner* — Marthe Y Marc-Coleman
(74) *Attorney, Agent, or Firm* — Lawrence D. Hazelton

(57) ABSTRACT

A safe-stop-zone identification system suitable for use on an automated-vehicle includes a digital-map, a transceiver, and a controller. The digital-map indicates a travel-path suitable for travel by a host-vehicle, wherein the digital-map also indicates a safe-stop-zone proximate to the travel-path. The transceiver is operable to broadcast information about the host-vehicle. The controller is in communication with the digital-map and the transceiver. The controller navigates the host-vehicle into the safe-stop-zone when an emergency-situation occurs, and then operates the transceiver to broadcast that the safe-stop-zone is occupied by the host-vehicle.

6 Claims, 2 Drawing Sheets

US 10,025,316 B1

AUTOMATED VEHICLE SAFE STOP ZONE USE NOTIFICATION SYSTEM

TECHNICAL FIELD OF INVENTION

This disclosure generally relates to a safe-stop-zone mapping system, and more particularly relates to a system configured to navigate a host-vehicle into a safe-stop-zone when an emergency-situation occurs, and then operate the transceiver to broadcast that the safe-stop-zone is occupied by the host-vehicle.

BACKGROUND OF INVENTION

Situations arise when it is necessary for a vehicle to pull-over or other-wise stop due to, for example, a medical emergency or mechanical failure in the vehicle. Situations also arise when an autonomous vehicle may require a human-operator to assume manual control of the vehicle, but the operator may not be ready or be capable to take over control because, for example, the operator is incapacitated, the operator lacks skills to operate the vehicle.

SUMMARY OF THE INVENTION

In accordance with one embodiment, a safe-stop-zone identification system suitable for use on an automated-vehicle is provided. The system includes a digital-map, a transceiver, and a controller. The digital-map indicates a travel-path suitable for travel by a host-vehicle, wherein the digital-map also indicates a safe-stop-zone proximate to the travel-path. The transceiver is operable to broadcast information about the host-vehicle. The controller is in communication with the digital-map and the transceiver. The controller navigates the host-vehicle into the safe-stop-zone when an emergency-situation occurs, and then operates the transceiver to broadcast that the safe-stop-zone is occupied by the host-vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
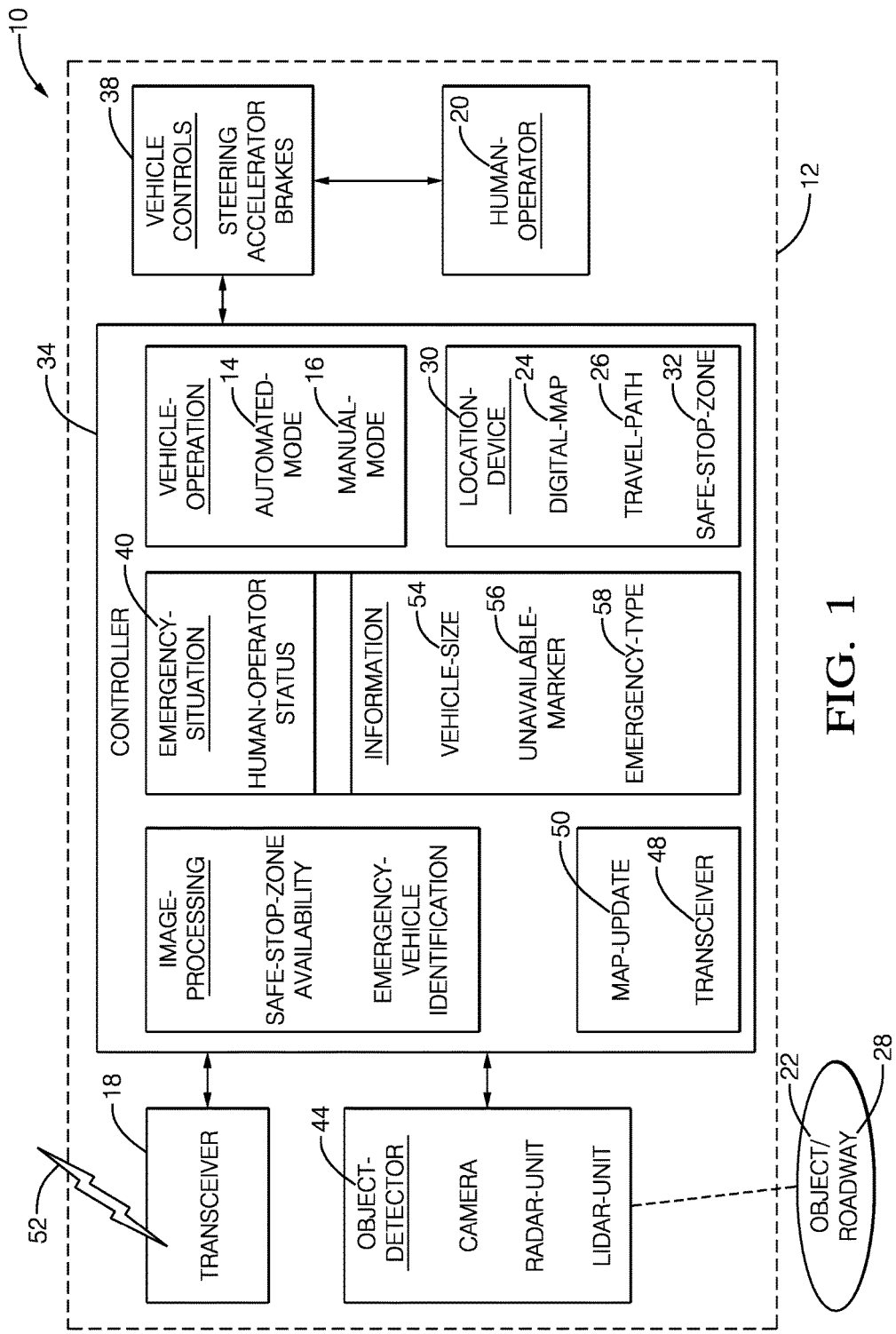
FIG. 1 is a diagram of a safe-stop-zone mapping system in accordance with one embodiment.

FIG. 1 illustrates a non-limiting example of a safe-stop-zone identification system 10, hereafter referred to as the system 10, which is suitable for use on an automated-vehicle, for example a host-vehicle 12. Some examples presented herein are generally directed to instances when the host-vehicle 12 is being operated in an automated-mode 14, i.e. a fully autonomous mode, where a human-operator 20 of the host-vehicle 12 may do little more than designate a destination in order to operate the host-vehicle 12. However, it is contemplated that the teachings presented herein are useful when the host-vehicle 12 is operated in a manual-mode 16 where the degree or level of automation may be little more than providing steering advice to the human-operator 20 who is generally in control of the steering, accelerator, and brakes of the host-vehicle 12. For example, the system 10 may merely assist the human-operator 20 as needed to change lanes and/or avoid interference with and/or a collision with, for example, an object 22 such as an other-vehicle.

The system includes a digital-map 24 that could be stored on or in the host-vehicle 12, or could be stored remotely 'in-the-cloud' and accessed via a variety of wireless communications protocols such as dedicated-short-range-communications (DSRC), as will be recognized by those in the art. The digital-map 24 is generally configured or used to indicate a travel-path 26 (FIG. 2) suitable for travel by a host-vehicle 12, for example a roadway 28. In order to navigate the travel-path 26, the system 10 may include a location-device 30 such as a global-positioning-system receiver that can be used to determine the location or position of the host-vehicle 12 on the digital-map. Alternatively, the system 10 may determine the location or position of the host-vehicle 12 on the digital-map 24 using other means such as optical recognition of various features of the landscape proximate to the host-vehicle 12, and/or DSRC communications with various infrastructure transceivers. The digital-map 24 may include data about the roadway 28 such as a lane-width and/or a speed-limit of the roadway 28.

It has been recognized that situations arise while traveling that require or make it preferable that the host-vehicle 12 should stop, i.e. pull-over off the traveled portions of the roadway 28. However, it is recognized that it would generally be unsafe to just stop while still occupying a lane of the roadway 28. Accordingly, the digital-map 24 described herein is an improvement over previous examples as the digital-map 24 also indicates a safe-stop-zone 32 proximate to (i.e. adjacent to or nearby) the travel-path 26. As used herein, the safe-stop-zone 32 may be, but is not limited to, a shoulder 36 of the roadway 28. Alternative examples of the safe-stop-zone 32 include, but are not limited to, an exit-ramp, a rest-area, a parking-lot, and a side-street with parallel parking spots. The safe-stop-zone 32 can be generally characterized in many ways such as: zones or areas large enough to stop without creating dangerous situations with respect to other-vehicles; areas where stopping will not increase traffic congestion; areas where the least amount of congestion and danger will occur; areas where wireless communication to the host-vehicle 12 is not obstructed; safe stopping areas on the side of the roadway 28 that avoid illegal zones and times of no parking; safe freeway center-lanes and side-lanes; and sides or shoulders of highway areas large enough to accommodate the host-vehicle 12.

The system includes a transceiver 18 operable to broadcast information 52 about the host-vehicle 12, and a controller 34 in communication with the digital-map 24 and the transceiver 18. The controller 34 is configured or programmed to navigate the host-vehicle 12 (e.g. operate the host-vehicle 12 if the system 10 is in the automated-mode 14, or provide route-guidance to the human-operator 20 if the system 10 is in the manual-mode 16) into the safe-stop-zone 32 when an emergency-situation occurs. The controller 34 also then operates the transceiver 18 to broadcast that the safe-stop-zone 32 is occupied by the host-vehicle 12. More details about what could be included in the information 52 will be provided later in this disclosure.

The transceiver 18 may be, by way of example and not limitation, a dedicated-short-range-communications (DSRC) transceiver, a Wi-Fi transceiver, or a cellularphone-network transceiver. By broadcasting that the safe-stop-zone 32 is occupied by the host-vehicle 12, other vehicles on the roadway 28 have foreknowledge that the safe-stop-zone 32 is occupied and therefore not available for use by other vehicles. Communication between the transceiver 18 and the controller 34 may be by way of wires, optical-cable, or wireless communications, as will be recognized by those in the art.

The controller 34 may include a processor (not specifically shown) such as a microprocessor or other control circuitry such as analog and/or digital control circuitry including an application specific integrated circuit (ASIC) for processing data as should be evident to those in the art. The controller 34 may include memory (not specifically shown), including non-volatile memory, such as electrically erasable programmable read-only memory (EEPROM) for storing one or more routines, thresholds, and captured data. The one or more routines may be executed by the processor to perform steps for determining the location of the safe-stop-zone 32 relative to the present location of the host-vehicle 12 on the travel-path 26. The communication between the controller 34 and the digital-map 24 may be by way of wires if the digital-map 24 is part of or located within the controller 34, or may be by way of wireless communication if the digital-map 24 is located 'in-the-cloud'.

The controller 34 may be configured to generally navigate the host-vehicle 12 along the travel-path 26, and the degree of automation determines what steps the controller 34 takes to navigate the host-vehicle 12. For example, if the host-vehicle 12 is being operated in the automated-mode 14, the controller 34 may be fully in control of the vehicle-controls 38 so that the human-operator 20 is merely a passenger of the host-vehicle and navigation of the host-vehicle 12 includes the controller 34 operating the steering, accelerator, and brakes of the host-vehicle 12. However, if the host-vehicle 12 is being operated in the manual-mode 16, the controller 34 may merely provide a display of a map corresponding to the present location of the host-vehicle 12 with turn-by-turn guidance if a destination has been designated.

Since the digital-map 24 includes data about the location of one or more instances of the safe-stop-zone 32, the controller 34 is advantageously configured to navigate the host-vehicle 12 into the safe-stop-zone 32 when an emergency-situation 40 occurs. As used herein, the emergency-situation 40 may be, but is not limited to, an instance when the human-operator 20 needs the host-vehicle 12 to stop because the human-operator 20 is suffering from motion-sickness (human-operator status), an instance when the host-vehicle 12 is suffering from a mechanical failure, e.g. a flat-tire that should be fixed rather than continuing to travel (vehicle status), or following a collision of the host-vehicle 12 with the object 22 whereby the host-vehicle 12 should be inspected before continuing to travel (collision detection). The human-operator status may be reported or indicated to the controller 34 by, for example, a verbal command such as "pull-over and stop", or "find a safe place to stop" issued by the human-operator 20.

Once the emergency-situation 40 is indicated to or detected by the controller 34, the controller 34 navigates the host-vehicle 12 into the safe-stop-zone 32. If the host-vehicle 12 is being operated in the automated-mode 14, then the controller 34 may navigate the host-vehicle into the safe-stop-zone 32 by autonomously operating the vehicle-controls 38. If the host-vehicle 12 is being operated in the manual-mode 16, then the controller 34 may show on a navigation-display (not shown) viewable by the human-operator 20 the location of one or more instances of the safe-stop-zone 32, and/or issue an audible notification to the human-operator 20 such as "safe-stop-zone on right in two-hundred meters" and/or "steer onto the shoulder and then stop."

Figure 2:
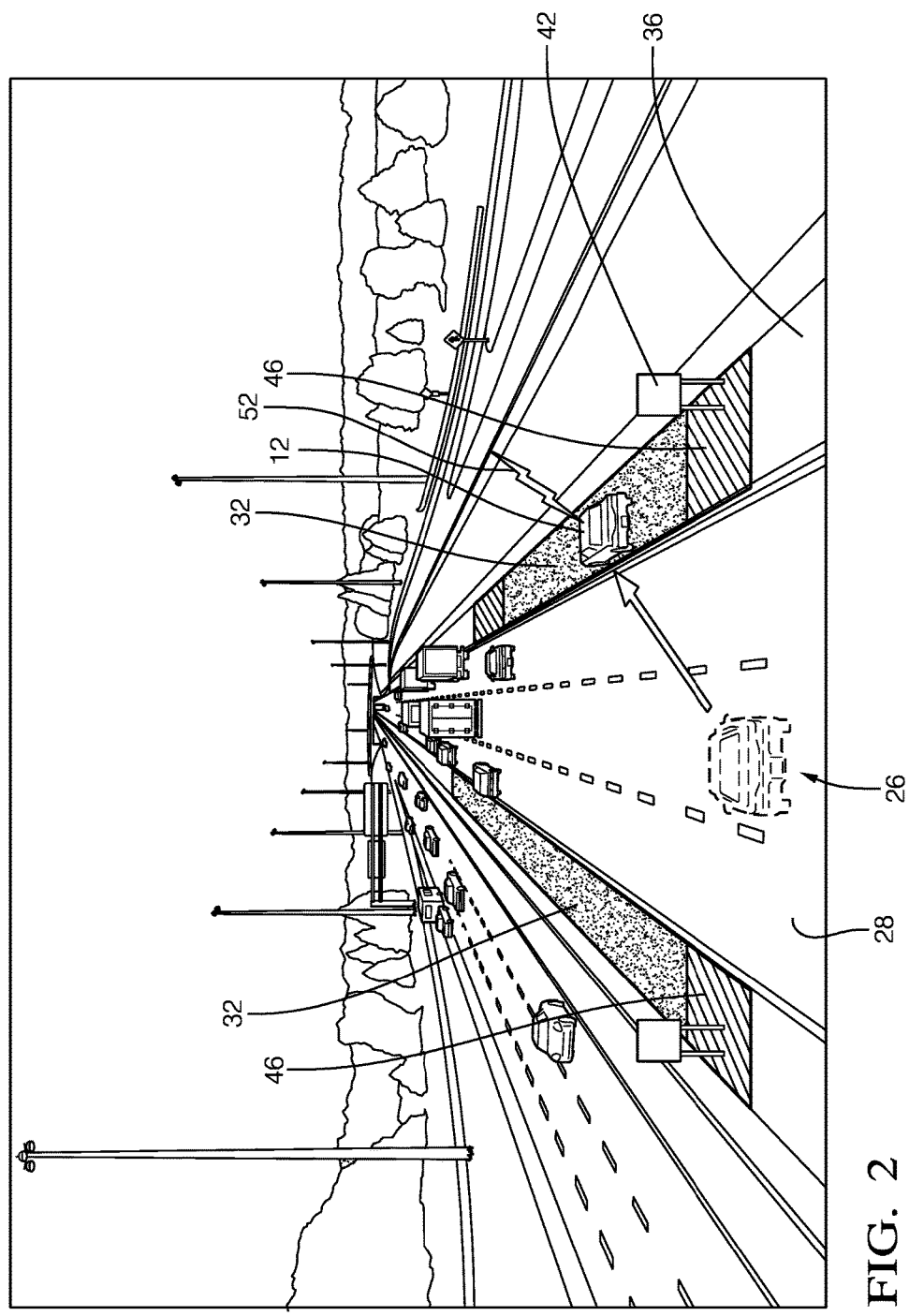
FIG. 2 is a traffic-scenario encountered by the system of FIG. 1 in accordance with one embodiment.

It is contemplated that instances may arise when an area designated as an instance of the safe-stop-zone 32 may be unexpectedly occupied by, for example, another vehicle, construction equipment, or a temporary-sign 42 (FIG. 2). In order to determine that an instance of the safe-stop-zone 32 is available for use by the host-vehicle, the system 10 may include an image-device 44 such as a camera, a radar-unit, a lidar-unit, or any combination thereof. The image-device 44 may be used by the controller 34 to determine if the safe-stop-zone 32 that host-vehicle 12 is about to enter is available for use by the host-vehicle 12. For example, if the image-device 44 detects the presence of the temporary-sign 42 in a portion of the shoulder 36 that the digital-map 24 indicates is or is part of an instance of the safe-stop-zone 32, then the controller 34 may be configured to look for the next instance of the safe-stop-zone 32, or what portion of the safe-stop-zone 32 is clear and thereby available for use by the host-vehicle 12.

The controller 34 may be further configured update the digital-map 24 when the safe-stop-zone 32 (or a portion thereof) is not available for use, e.g. is already occupied. For example, the controller 34 update the digital-map 24 to designate a portion of the shoulder 36 where the temporary sign 42 is located as a not-available-zone 46. If the digital-map 24 is stored 'in-the-cloud', the system 10 may include another transceiver 48 configured to send a map-update 50 to the digital-map 24 regarding the detection of the non-available-zone 46. It is also contemplated that the controller 34 may be further configured to update the digital-map 24 when the safe-stop-zone 32 (or a portion thereof) is available for use when the digital-map 24 reports that it is unavailable. For example, the controller 34 may update the digital-map 24 to designate a portion of the shoulder 36 where the temporary sign 42 is no longer located as available that was previously marked as unavailable in the digital-map 24.

It is also contemplated that instances may arise when the host-vehicle 12 is being operated in the automated-mode 14, but for any of numerous reasons which are recognized by those in the art, it is advisable, preferable, or necessary to change the vehicle-operation to the manual-mode 16. By way of a non-limiting example, if the data provided by the digital-map 24 is insufficient or does not correspond sufficiently to what sensors for automated operation observe about the roadway, changing the vehicle-operation to the manual-mode 16 may be prudent. However, it is also contemplated that instances may arise when the human-operator 20 is unable to assume control of the host-vehicle 12. By way of a non-limiting example, the human-operator 20 may be sleeping, possibly not residing in the drivers-seat, or otherwise incapacitated and unable to assume control of the host-vehicle 12. As such, the controller 34 may be configured to continue to operate in the automated-mode 14 just long enough to navigate (i.e. autonomously operate the vehicle-controls 38) the host-vehicle 12 into the safe-stop-zone 32 when the manual-mode 16 for operation of the host-vehicle 12 is recommended and the human-operator 20 is unable to assume control of the host-vehicle 12. It is also contemplated that instances may arise when the system 10 determines that there is stopped traffic ahead by communicating to nearby vehicles, and then using image device 44 the host-vehicle 12 moves to the nearest available safe-stopzone for object collision avoidance until traffic condition that caused the stopped traffic is resolved.

FIG. 2 illustrates a non-limiting example of a traffic-scenario encountered by the host-vehicle 12 where the host-vehicle 12 navigates into the safe-stop-zone 32. As mentioned above, after the host-vehicle 12 arrives at the safe-stop-zone, the controller 34 is programmed or configured to operate the transceiver 18 to broadcast that the safe-stop-zone 32 is occupied by the host-vehicle 12. The information 52 (in addition to the fact that the safe-stop-zone 32 is occupied by the host-vehicle 12) may include other facts that may be relevant to the other vehicles proximate to the host-vehicle. The following non-limiting examples are just some of the facts that could be included in the information 52.

The information 52 may include a vehicle-size 54 of the host-vehicle 12. The vehicle-size 54 may be used by other vehicles to determine if the host-vehicle 12 has occupied the entirety of the safe-stop-zone 32, or if there is room for additional vehicle to stop in the safe-stop-zone 32. Also, if the host-vehicle 12 were an over-sized-load type of vehicle (e.g. a semi-trailer combination hauling large construction equipment) then the other vehicles may change lanes so as to avoid the travel-lane immediately adjacent to the safe-stop-zone 32.

The information 52 may include an unavailable-marker 56 used to classify the safe-stop-zone 32 in the digital-map 24. That is, the unavailability-marker 56 may be communicated to the digital-map 24 stored 'in the cloud' so that the maps used by the other vehicles can be updated with the latest information. Instead of, or in addition to the vehicle-size 54, the unavailable-marker 56 may designate a portion or fraction or percentage of the safe-stop-zone 32 that is unavailable for use by other vehicles. For example, if the safe-stop-zone 32 is relatively large, a kilometer of shoulder along the roadway 28 for example, then even though the host-vehicle 12 occupies the safe-stop-zone 32, it will be apparent that there is plenty of room for other vehicles to stop in the safe-stop-zone 32.

The information 52 may include an emergency-type 58 such as, but not limited to one or more of 'vehicle-disabled', 'vehicle-on-fire', 'medical-emergency', and 'police-needed'. If the 'vehicle-disabled' message is broadcast, a tow-truck monitoring for the broadcast of the information 52 may be dispatched to repair or tow-away the host-vehicle 12. If the 'vehicle-on-fire' message is broadcast, a fire-truck may be dispatched to the host-vehicle 12. If the 'medical-emergency' message is broadcast, an ambulance may be dispatched to the host-vehicle 12. If the 'police-needed' is broadcast, a police officer may be dispatched. These messages may be broadcast in response to a query of the human-operator 20 by the system 10, or initiated by the human-operator 20, or automatically broadcast if a collision and/or a fire are detected in or nearby the host-vehicle 12.

Accordingly, a safe-stop-zone identification system (the system 10), a controller 34 for the system 10, and a method of operating the system 10 is provided. The system 10 improves safety by providing information 52 to other vehicles regarding the occupancy of the safe-stop-zone 32 so that the other vehicle can avoid passing close to the safe-stop-zone 32 if prudent, or search for another instance of safe-stop-zone if the nearest one is already occupied. As the host-vehicle 12 gets closer to the determined safe-stop-zone 32, the system 10 can communicate to the vehicles in the adjacent safe-stop zones to determine their intent of leaving or staying in the safe-stop-zone to avoid any potential crashes. In the event that a large-vehicle (a trailer, big SUV) in the adjacent safe-stop-zone is leaving and the host-vehicle 12 cannot enter the safe-stop-zone 32 safely, to avoid any high-risk maneuvers, the system 10 will look for the next nearest safe-stop-zone. As the host-vehicle 12 gets closer to the determined safe-stop-zone 32, the system 10 could use image-processing to detect brake lights, turn lights, and other visual indicators to determine if the vehicles in the adjacent safe-stop zones are leaving or staying. This may be helpful when the digital-map 24 indicates that the safe-stop-zone 32 is occupied, but the vehicle occupying the safe-stop-zone is preparing to vacate the safe-stop-zone. The system 10 may also be configured to broadcast that the host-vehicle 12 is waiting for an about to be vacated safe-stop-zone so that multiple other vehicles also are not waiting for the same safe-stop-zone.

While this invention has been described in terms of the preferred embodiments thereof, it is not intended to be so limited, but rather only to the extent set forth in the claims that follow.

We claim:

1. A safe-stop-zone identification system suitable for use on an automated-vehicle, said system comprising:
   a digital-map that indicates a travel-path suitable for travel by a host-vehicle, wherein the digital-map also indicates a safe-stop-zone proximate to the travel-path;
   a transceiver operable to broadcast information about the host-vehicle; and
   a controller in communication with the digital-map and the transceiver, said controller configured to navigate the host-vehicle into the safe-stop-zone when an emergency-situation occurs, and then operate the transceiver to broadcast that the safe-stop-zone is occupied by the host-vehicle.

2. The system in accordance with claim 1, wherein the information includes a vehicle-size of the host-vehicle.

3. The system in accordance with claim 1, wherein the information includes an unavailable-marker used to classify the safe-stop-zone in the digital-map.

4. The system in accordance with claim 3, wherein the unavailable-marker designates a portion of the safe-stop-zone that is unavailable for use by other vehicles.

5. The system in accordance with claim 1, wherein the information includes an emergency-type.

6. The system in accordance with claim 5, wherein the emergency-type includes one or more of vehicle-disabled, vehicle-on-fire, medical-emergency, and police-needed.

* * * * *